June 25, 1957 H. E. B. SCOTT 2,796,808
VORTEX SEPARATORS
Filed Nov. 4, 1955 4 Sheets-Sheet 1

Inventor
Harold Eric Daliol Scott
By Moses, Nolte, Crews & Berry
Attorneys

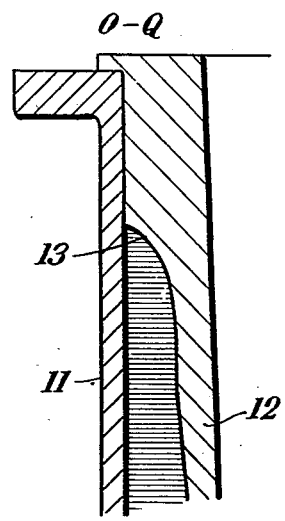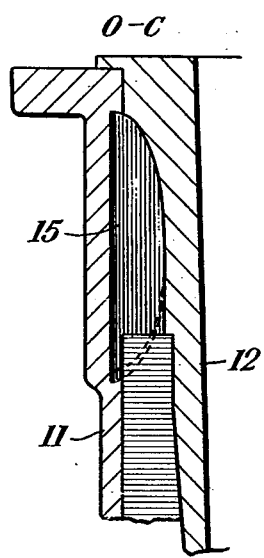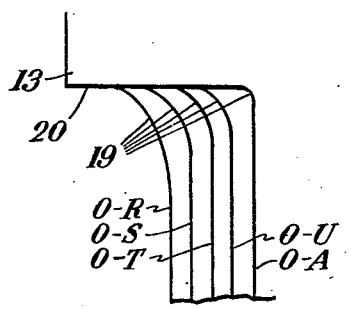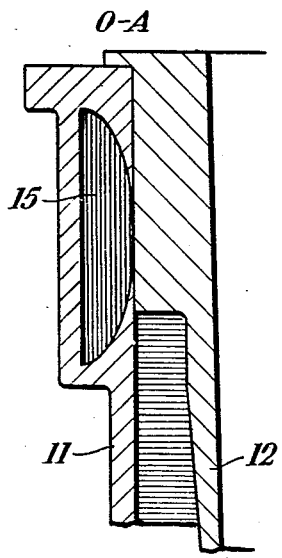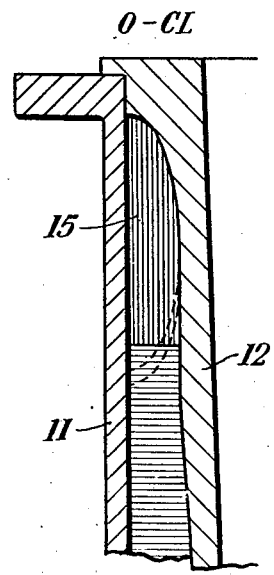

United States Patent Office 2,796,808
Patented June 25, 1957

2,796,808

VORTEX SEPARATORS

Harold Eric Baliol Scott, Weybridge, England, assignor to Vickerys Limited, London, England, a British company Application November 4, 1955, Serial No. 545,050

Claims priority, application Great Britain December 6, 1955

9 Claims. (Cl. 92—28)

This invention relates to vortex separators for use in the treatment of liquids and suspensions of solids in liquids. In such separators, the material to be treated is injected tangentially at high speed at one end, usually the top end, of an upright vortex vessel, which may be cylindrical or conical, and the purified material may leave the vortex vessel either at its top or at its bottom end. The invention relates particularly, but not exclusively, to vortex separators for paper pulp of the kind described in my United States Patents Nos. 2,375,826 and 2,377,721, in which the purified material emerges from the vortex vessel in an upward direction while the separated impurities are removed from the vortex vessel in a downward direction.

In vortex separators, centrifugal force throws the heavy impurities to the outside of the rotating column of liquid and it is advantageous to inject the material in a thin stream measured in the radial direction so that the impurities have only a short distance to travel before reaching the wall of the vortex vessel.

Figure 1:
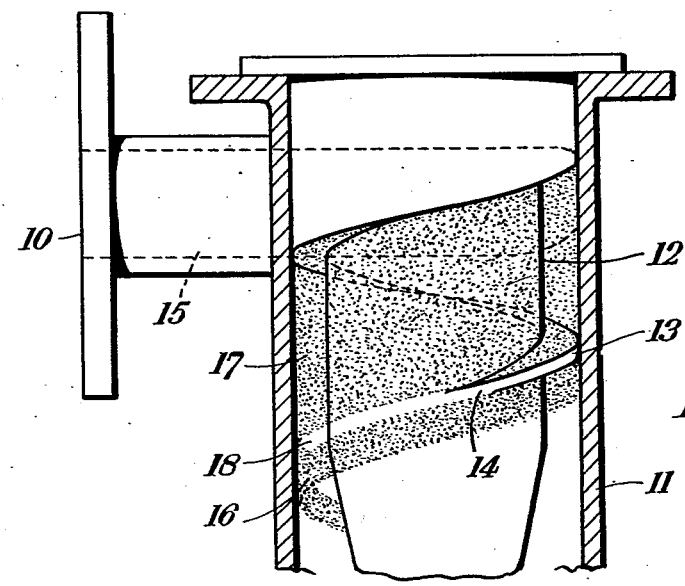

Figure 1 of the accompanying drawings is a diagrammatic elevation, partly in section, of an inlet head of a vortex separator of the type which is illustrated in Figure 1 of the applicant's U. S. Patent No. 2,377,721.

The inlet head shown in Figure 1 of the accompanying drawings is fitted to the top of the vortex vessel and with it, forms a vortex chamber in which vortex formation and separation of impurities take place. As shown, the slurry enters tangentially through an inlet nozzle 10 communicating, via an inlet passage 15, with a helical canal of steadily increasing radial depth and having a constant axial depth equal to that of the inlet passage. This helical canal is formed between the sides of the helical rib or thread 13 and the curved wall of the sleeve 12. The crest of the rib abuts the inner wall of the inlet head 11. The helical rib terminates in a trailing tail 14 tapering down to the wall of the sleeve 12. As the slurry passes through the helical canal a rotary motion is imparted thereto. With this sleeve 12 the square or slightly rounded corners of the crest and/or root of the rib or thread suffer badly from cavitation erosion, probably caused by a zone of low pressure in the corners due to the velocity distribution in the stream of the slurry in which the velocity is lower in the corners than in the main stream. Another disadvantage of inlets which have a helical canal formed between the sides and root of a helical thread or rib, i. e. a passage with walls on all four sides, whether the thread or a rib is formed externally on the inner sleeve or internally on the body of the inlet head, is that the thread or rib, which must be of substantial thickness in order to give a reasonable life, causes a void or separation in the flow of the slurry entering in the vortex chamber and in the formation of the wake behind said trailing tail of depth equal to or dimensions commensurate with the thickness of the thread or rib. This void or separation occurs between the stream 16 of slurry which has made one turn in the vortex chamber (described hereinafter as the one turn stream) and the stream 17 coming in through the helical canal, and this separation and is indicated at 18 in Fig. 1. This void or low pressure zone have to be filled up by the incoming stream spreading downward and the slurry which has made one turn in the vortex chamber spreading upward. The two converging streams which do not completely fill the void create eddies and turbulence which interferes with the smooth flow and separation of the impurities contained in the fluid. The void or low pressure zone formed between the two converging streams also gives rise to cavitation erosion.

In other known vortex separators there are present either discontinuities producing eddies and pockets of low pressure causing cavitation erosion or the separators are designed so that the velocity of the incoming stream of slurry is very quickly reduced at or near the entrance to the vortex chamber, resulting in a loss of centrifugal effect. The inlet passages are also such that they cannot be produced of accurate shape and so as to have a smooth surface so that turbulence is produced.

The object of this invention is to provide an improved form of inlet head of smooth contour, which can be easily manufactured to the correct form and having no discontinuities or projections or ribs, and such as will provide a smooth streamline flow and blending of the incoming stream and the one turn stream, thereby avoiding turbulence and cavitation erosion.

The invention relates to a vortex separator, comprising an upright vortex vessel having a tangential inlet passage communicating with the interior of the vortex vessel by means of a helical or vortex passage determined between a cylindrical side wall and a contoured helical end wall beginning at the end of said passage remote from the vortex vessel, the other end of the helical passage merging with the vortex chamber in the vortex vessel and the axial depth of the inlet passage, where it meets the helical passage, being sufficiently greater than the pitch of said contoured helical end wall to ensure overlapping of the inlet stream of liquid with the stream of liquid which has made one turn in the helical passage and thereby to exclude the possibility of the formation of a low pressure zone in said passage.

In the case where the inlet is at the top of the vortex vessel, the helical or vortex passage may conveniently be defined between concentric inner and outer sleeves, the inner sleeve being formed with a protuberance or scroll having a helical base surface. The helical passage is accordingly open at the bottom. The amount of overlap between the inlet stream and the one turn stream can readily be made such that the two streams completely fill the area between the helical scroll and the outer wall of the vortex chamber. There is thus no possibility of low pressure zones being formed. As the two streams completely fill the entry into the vortex vessel without having to expand the velocity of the slurry is maintained at the maximum available having regard to the inlet pressure and the pressure drop across the inlet. Therefore the maximum centrifugal efficiency is obtained in the vortex vessel.

Figure 4:
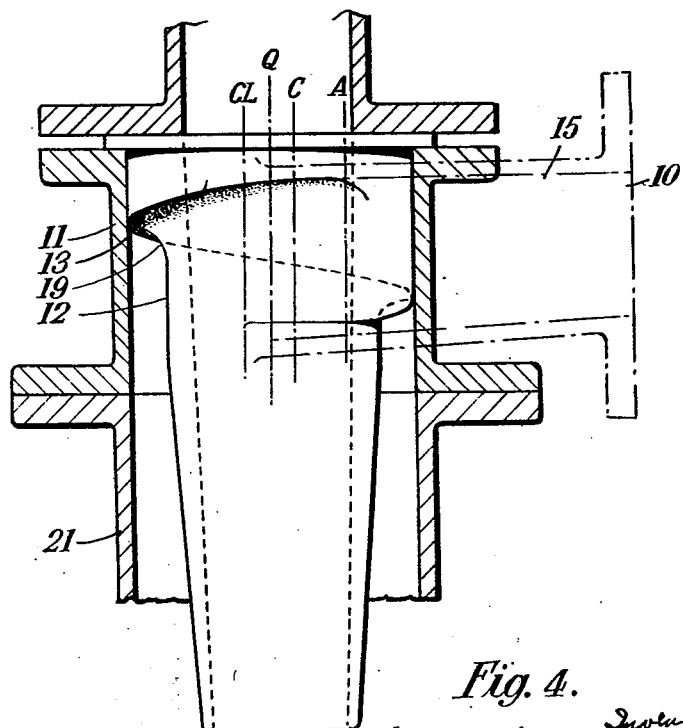
Figure 2:
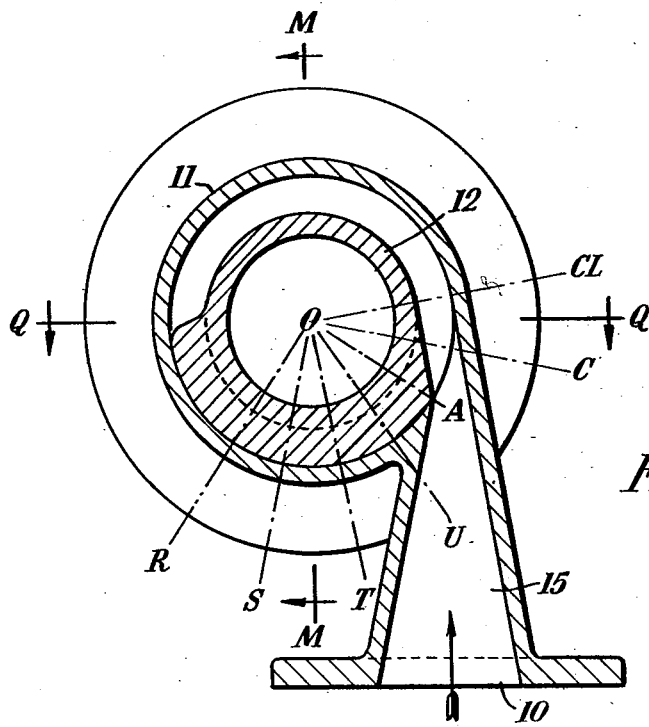
Figure 3:
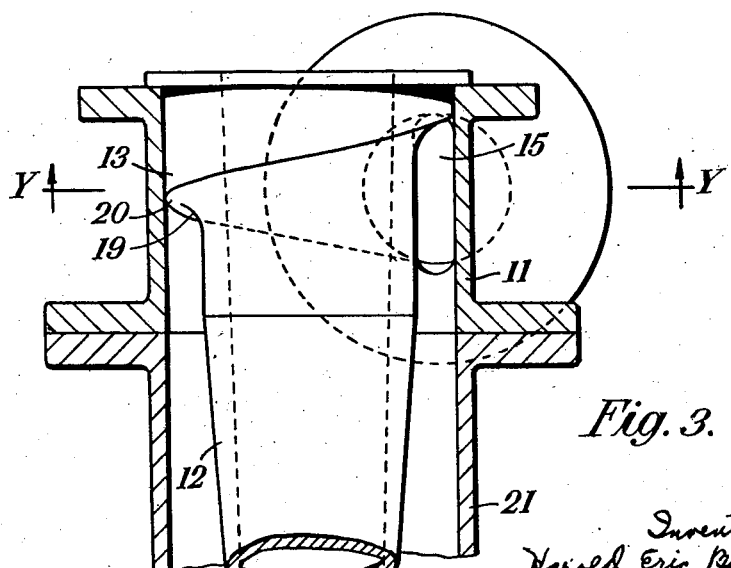
Figure 9:
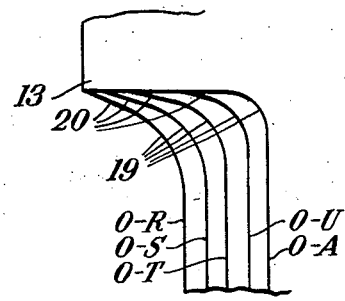
Figure 7:
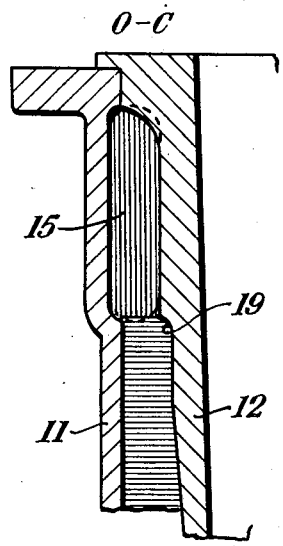
Figure 8:
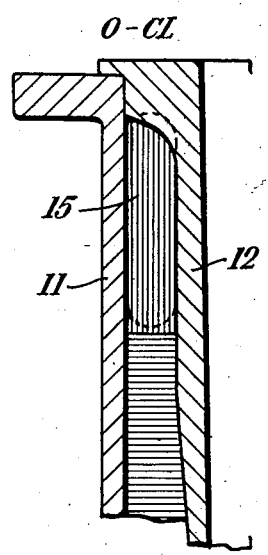

Two embodiments of the invention will now be described in more detail, by way of example, with reference to Figs. 2–14 of the accompanying drawings, Figs. 2–9 showing the first embodiment and Figs. 10–14 the second embodiment. In the drawings like reference numerals denote like parts throughout the figures and:

Fig. 2 is a horizontal section through the inlet head of the first embodiment, taken on the line Y—Y in Fig. 3, Figs. 3 and 4 are respectively sections on the lines Q—Q and M—M in Fig. 2, Figs. 5–8 are sections taken respectively on the lines O—Q, O—A, O—C and O—CL in Fig. 2, Fig. 9 is a multiple view showing variations in the shape of the helical passage at various positions, Figs. 10–13 are views of the second embodiment corresponding respectively of Figs. 5–8, and Fig. 14 is a view of the second embodiment corresponding to Fig. 9.

In Figs. 5–8 and in Figs. 10–13 the incoming stream of liquid is hatched vertically and the liquid in the vortex chamber is hatched horizontally.

In the arrangement shown in Figs. 2–9 the inlet head comprises a tubular sleeve 11 attached to the top of the vortex vessel 21 and co-operating with the vortex vessel to form a vortex chamber. The inlet nozzle is shown at 10 and the tangential inlet passage at 15. This enters tangentially at O—CL (Fig. 2) a helical passage or vortex formed between the sleeve 11 and an inner sleeve 12, through which sleeve the purified pulp passes upwardly from the separator. This helical passage is open at the bottom and defined at the top by the helical base surface referred to in the claims as a base face of a protuberance or scroll 13 on the head of sleeve 12 and this passage is defined at the side by a cylindrical wall below said base face. As will be apparent from Figs. 3 and 4, the axial depth of the inlet passage 15, where it meets the helical passage, is greater than the pitch of the scroll 13, so that the incoming stream of pulp overlaps the one turn stream of pulp.

Figure 5:
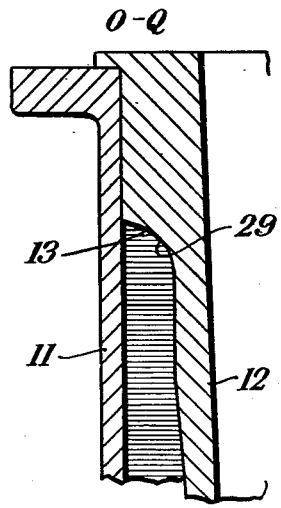
Figure 6:
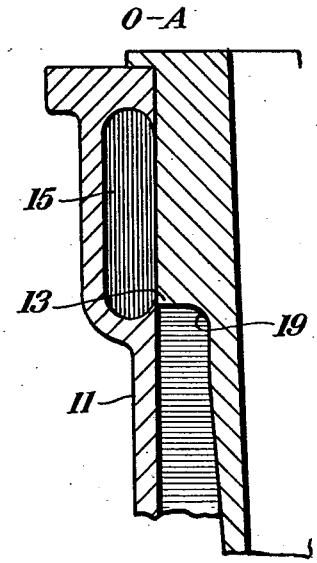

Over about the first half turn of the helix the base surface of the scroll 13 has the contour shape indicated in Fig. 5, having a radius 29 in its corner equal to at least one half of its width, but preferably more than this. During the second half turn, however, the contour shape of the base surface of the scroll changes progressively as schematically indicated in Fig. 9. As there shown, said base surface is provided for a portion of its length in its corner with a radius 19. The plane portion 20 of base surface adjoining the sleeve 11 is inclined to the axis of the sleeve 12. The inclination of the portion 20 to said axis and the radius of the remaining portion 19 decrease progressively from the section O—R to the section O—A. At section O—A, the portion 20 is substantially at right angles to the axis of the sleeve 12. The radius of the remaining portion 19 gradually decreases beyond the section O—R in the direction of flow until it is zero at the section O—CL and the base surface vanishes at this section. The effect of these gradual changes in the shape of the base surface of the scroll 14 and the eccentric cylindrical wall between the ends of said base face is to provide a smooth change in shape of the inlet stream from one having rounded corners to one of truly rectangular shape and vanishing on the body of the sleeve in the vortex chamber. Also, as there is a difference of pitch between the outer edge and the inner edge of the base surface of the scroll, there is produced hydraulic shear in the stream of slurry in the region of the highest velocity, and this shear tends to loosen any dirt particles which may be entangled with the fibres in the slurry.

In the arrangement shown in Figs. 10–14, the inlet passage 15 has the section of a half ellipse with its major axis vertical and lying along the inner wall of the outer sleeve 11. The advantage of this is that the outer half of the inlet passage contains three fifths of the volume of the inlet stream and therefore contains the major portion of the impurities which, accordingly, do not have to travel so far to reach the wall of the vortex chamber. This shape of inlet is of advantage when thick slurries, particularly slurries of a fibrous nature, have to be treated.

As shown in Fig. 10, the shape of the base surface of the scroll 13 conforms, over about the first half turn of the helix, to the shape of the top half of the half-elliptical section of the passage 15. During the second half-turn of the helix, the shape of the base surface of the scroll changes progressively as shown in Fig. 14 until, at the end of the scroll, the base surface is substantially horizontal and vanishes in the body of the sleeve in the vortex chamber.

What I claim as my invention and desire to secure by Letters Patent is:

1. A vortex separator comprising a vessel having a tangential fluid nozzle tapering to a fluid opening of elongated cross section with the longer axis substantially parallel to the axis of said vessel, a fluid vortex chamber in said vessel, a tubular sleeve extending into said vessel, said tubular sleeve including a head and a body both having coaxial cylindrical side faces, said head being disposed substantially opposite said fluid opening and including a base face with a substantially helical outer edge and with an intermediate wall face between the said outer edge and said body side face, said base face starting and vanishing at said fluid opening and extending for not more than one revolution about the axis of said tubular sleeve, said base face together with said adjacent body side face cooperating with the adjacent wall of said vessel to close said vortex chamber and impart rotation to fluid from said fluid opening, said helical outer edge having a pitch smaller than the length of the longer axis of said fluid opening to form a gap between the vanishing end of said base face and the wall of said fluid opening through which fluid from said fluid opening blends in said vortex chamber directly with fluid already rotated against said base face, said intermediate wall face having a plane portion extending from said helical outer edge and a curved remainder which tangentially merges with said plane portion and with said body side face, said plane portion being provided with an inclination becoming perpendicular to said body side face as said base face approaches said gap with the radius of said curved remainder decreasing progressively as said plane portion becomes perpendicular and until said base face vanishes, whereby there is obtained substantially streamline flow and overlapping of the fluid at said fluid opening and fluid already rotated against said base face so that separation of impurities in said fluid is improved and so that the possibility of the formation of a low pressure zone in said vortex chamber adjacent said fluid opening is precluded.

2. A vortex separator constructed according to claim 1, wherein the cross section of said fluid opening is substantially a half ellipse with the longer axis substantially coinciding with the outer wall of said vortex chamber.

3. A vortex separator constructed according to claim 1, wherein said inclination of said plane portion and said radius of said curved remainder are substantially constant for about the first half of the pitch of said helical edge and thereafter vary progressively.

4. A vortex separator comprising a vessel having a tangential fluid nozzle tapering to a fluid opening of elongated cross section with the longer axis substantially parallel to the axis of said vessel, a fluid vortex chamber in said vessel, a flanged tubular sleeve extending into said vortex chamber with the flanged portion thereof substantially opposite said fluid opening and with the body thereof therebelow, the flange wall at the inner face of said flanged portion starting and vanishing at said fluid opening and following a substantially helical path for not more than one revolution about an axis parallel with and substantially coaxial to the axis of said tubular sleeve and with the helix having a pitch smaller than the length of the longer axis of said fluid opening to define a gap between the vanishing end of said flange wall and said fluid opening, said flange wall at said inner face of said flanged portion having a curved contour sloping from the outer edge of said flanged portion which deviates and diminishes around the surface of the body of said tubular sleeve until the curved contour becomes substantially plane and perpendicular to the surface of the body of said tubular sleeve and vanishes, said flange wall at said inner face of said flanged portion together with the adjacent surface of the body of said tubular sleeve cooperating to close said vortex chamber and impart rotation to fluid from said fluid opening, said gap allowing fluid from said fluid opening to blend in said vortex chamber directly with fluid already rotated against said base face, whereby there is obtained substantially streamline flow and overlapping of fluid at said fluid opening with fluid in said vortex chamber which has already rotated against said flange wall at said inner face of said flange portion so that separation of impurities in said fluid is improved and cavitation erosion of said tubular sleeve is reduced by excluding the formation of a low pressure zone in said vortex chamber adjacent said fluid opening.

5. A vortex separator constructed according to claim 4, wherein the cross section of said fluid opening is substantially a half ellipse and substantially coincides with the outer wall of said vortex chamber.

6. A vortex separator constructed according to claim 4, wherein said curved contour of said flange wall at said inner face of said flange portion remains substantially constant for about the first half of the pitch of said helical edge and thereafter varies progressively.

7. A vortex separator comprising a vessel member having a tangential fluid nozzle tapering to a fluid opening of elongated cross section with the longer axis substantially parallel to the axis of said vessel member, a fluid vortex chamber in said vessel member, a tubular sleeve member extending into said vessel member and at said fluid opening, one of said members being provided with a transverse helical wall face on the outer surface thereof which begins and vanishes substantially opposite said fluid opening and defines in cooperation with the wall of said vessel member vortex chamber a substantially 360 degrees helical wall for imparting rotational motion to fluid, said helical wall being provided with a contoured surface of diminishing area and with an angle with respect to the outer surface of said tubular sleeve member which progressively approaches 90 degrees and then vanishes for affording streamline flow of the rotating fluid, and a bypass passage defined between said fluid opening and the vanishing end of said wall face for blending in said vortex chamber fluid from said fluid opening directly with fluid already rotated against said helical wall, whereby separation of impurities contained in said fluid is improved and whereby cavitation erosion of said tubular sleeve is reduced by excluding the formation of a low pressure zone in said vortex chamber.

8. A vortex separator constructed according to claim 7, wherein the cross section of said fluid opening is substantially a half ellipse with the longer axis substantially coinciding with the outer wall of said vessel member vortex chamber.

9. A vortex separator constructed according to claim 7, wherein said contoured surface is helical and substantially constant for about the first half of the pitch thereof and thereafter varies progressively.

References Cited in the file of this patent

UNITED STATES PATENTS

| | | |
|---|---|---|
| 762,867 | Allen | June 21, 1904 |
| 2,102,525 | Freeman | Dec. 14, 1937 |
| 2,187,646 | Darrieus | Jan. 16, 1940 |
| 2,346,005 | Bryson | Apr. 4, 1944 |
| 2,364,799 | Laughlin | Dec. 12, 1944 |
| 2,375,826 | Scott | May 15, 1945 |
| 2,377,721 | Scott | June 5, 1945 |

FOREIGN PATENTS

| | | |
|---|---|---|
| 1,039,869 | France | Oct. 12, 1953 |